US007258053B2

(12) United States Patent
Suer et al.

(10) Patent No.: US 7,258,053 B2
(45) Date of Patent: Aug. 21, 2007

(54) HOT DOG SLICER

(75) Inventors: Edwin E. Suer, Livonia, MI (US); Scott McGillivary, Sterling Heights, MI (US)

(73) Assignee: Octodog, Inc., Livonia, MI (US)

( * ) Notice: Subject to any disclaimer, the term of this patent is extended or adjusted under 35 U.S.C. 154(b) by 0 days.

(21) Appl. No.: 10/047,586

(22) Filed: Oct. 29, 2001

(65) Prior Publication Data

US 2002/0100173 A1 Aug. 1, 2002

Related U.S. Application Data

(60) Provisional application No. 60/243,775, filed on Oct. 27, 2000.

(51) Int. Cl.
*A47J 43/00* (2006.01)
*A21C 5/08* (2006.01)

(52) U.S. Cl. .............................. 83/822; 83/13; 83/613; 83/620; 83/622; 30/114; 30/128; 426/92; 426/104; 426/105; 99/430; 99/441; 99/509; 99/537

(58) Field of Classification Search .................. 30/124, 30/128, 114; 83/882, 620, 622, 648, 879, 83/832, 437.1, 437.2, 932, 13, 883, 870, 83/885, 451, 613, 624, 761, 762; 17/25; 426/92, 104, 105, 144, 646, 641, 76; 99/430, 99/441

See application file for complete search history.

(56) References Cited

U.S. PATENT DOCUMENTS 1,405,401 A * 2/1922 Ernst ........................... 83/620
2,479,982 A * 8/1949 Eugene .................... 83/435.15
2,509,190 A * 5/1950 Langley ....................... 99/545
2,645,262 A * 7/1953 Marasco .................. 83/435.15
2,675,580 A * 4/1954 Pesce .......................... 452/30
3,060,838 A * 10/1962 Priore ......................... 99/430
3,128,810 A * 4/1964 Whipp ........................ 99/545
3,465,802 A 9/1969 Alea .......................... 146/203
3,786,564 A * 1/1974 Acheson ...................... 30/124
3,857,330 A 12/1974 Ruckstaetter ................ 99/354
3,940,842 A 3/1976 Perrinelle et al. ............. 30/278
3,999,293 A 12/1976 Zubrycki ..................... 30/124
4,071,950 A 2/1978 Telesio ........................ 30/124
4,072,075 A * 2/1978 Ezaki .......................... 83/153
4,195,402 A * 4/1980 Leffer .......................... 30/114
4,250,771 A * 2/1981 Berler ......................... 81/487
4,297,932 A * 11/1981 Wells et al. ............... 83/581.1
4,436,025 A * 3/1984 Jones .......................... 99/538
4,569,280 A * 2/1986 D'Ambro et al. ............. 99/538
4,580,343 A * 4/1986 Bell, Jr. ........................ 30/114
D284,441 S 7/1986 Way ............................ D7/106
4,839,183 A 6/1989 Perrine ....................... 426/274
4,976,029 A 12/1990 Kennedy ..................... 30/114
5,067,241 A 11/1991 Goodman .................... 30/289

(Continued)

*Primary Examiner*—Boyer D. Ashley
*Assistant Examiner*—Ghassem Alie
(74) *Attorney, Agent, or Firm*—L. C. Begin & Associates, PLLC

(57) ABSTRACT

A food slicer 10 of the present invention contains a hollow body 12 having an inner wall 13 defining an interior 17 and an outer wall 15 for containment of a food product therein. A plurality of blades 32 extends across the interior 17 of the body thereby cutting a food product biased against the blades 32 into a plurality of portions.

2 Claims, 6 Drawing Sheets

U.S. PATENT DOCUMENTS

| | | | | | |
|---|---|---|---|---|---|
| 5,069,914 | A | * | 12/1991 | Gagliardi, Jr. | 426/76 |
| 5,101,718 | A | * | 4/1992 | Lin | 99/545 |
| D329,967 | S | | 10/1992 | Kennedy | D7/693 |
| D337,643 | S | | 7/1993 | Betz, Jr. | D1/125 |
| 5,271,317 | A | * | 12/1993 | Aguerrevere et al. | 99/538 |
| 5,363,756 | A | * | 11/1994 | Muro | 99/538 |
| 5,520,105 | A | * | 5/1996 | Healy | 100/98 R |
| 5,662,033 | A | * | 9/1997 | Yawman | 99/538 |
| 5,746,106 | A | | 5/1998 | Hodges | 83/884 |
| 5,771,771 | A | * | 6/1998 | Gagliardi, Jr. | 83/882 |
| 5,779,294 | A | * | 7/1998 | Magri | 294/61 |
| 6,018,876 | A | | 2/2000 | Hodges et al. | 30/279.2 |
| 6,187,361 | B1 | * | 2/2001 | Fleetham | 426/513 |
| 6,451,262 | B1 | * | 9/2002 | Chiodo | 422/99 |
| 2003/0079350 | A1 | * | 5/2003 | Howman et al. | 30/114 |

* cited by examiner

HOT DOG SLICER

CROSS-REFERENCE TO RELATED APPLICATIONS

The present application claims the benefit of U.S. Provisional Application Ser. No. 60/243,775 having a filing date of Oct. 27, 2000.

FIELD OF THE INVENTION

The present invention generally relates to a device for slicing wieners thereby enhancing the appearance of the hot dog and reducing the size of the bite-size portions.

BACKGROUND OF THE INVENTION

The hot dog is eaten in almost every household and in many public events. It is one of the main food offerings in many entertainment activities such as baseball, for example. Often characterized as an "American tradition", the hot dog is a staple food product at picnics, sporting events, and campouts.

One of the concerns related to hot dogs or other cylindrical food products is the diameter and/or size of a normal bite-size piece. The American Academy of Pediatrics (AAP) recognizes that hot dogs or other round firm foods present common choking hazards. The August 1999 issue of *Child Magazine* indicates that hot dogs are among the top ten foods most likely to cause choking in children. Additionally, it is estimated that 78% of choking injuries occur in children under four years old, according to studies completed at the Dupont Hospital for Children in Wilmington, Del. Oftentimes infants or young children simply do not grind or chew their food well and they may attempt to swallow it whole. The AAP therefore recommends that these types of foods be cut or chopped to reduce the bite size, and, that they be consumed by infants and young children under adult supervision.

It is also well recognized that children may be finicky eaters. It therefore would be an improvement in the art to provide a utensil that not only quickly slices the food product to reduce choking hazards, but also forms a shape attractive to young children.

SUMMARY OF THE INVENTION

The present invention is a device for slicing sausage or cylindrically shaped food or meat products such as hot dogs, bratwurst, sausage, and the like.

One object of the present invention is to improve the appearance of the meat of food product thereby increasing the eating enjoyment for children or sports fans. The preferred embodiments, for example, slice hot dogs into a shape that resembles an octopus.

Another object of the present invention is to enhance the safety of the food product by reducing the chewable size of the portions of the meat product. Additionally, the firm and round dimensions of the meat product are substantially eliminated. Potential choking hazards are therefore minimized.

Accordingly, a cylindrically shaped hollow body containing an internal plurality of blades is provided. The food product is inserted into the cylinder and then sliced by linear movement of the blades over at least a portion of the length of the cylinder. Alternatively, the blades may be fixed across the diameter of the cylinder whereby forcing the food or meat product past the blades results in the same cut to the meat. The resulting food product exhibits uniformly sliced portions of the cylindrical food product having approximately equivalent dimensions.

DESCRIPTION OF THE PREFERRED EMBODIMENT(S)

Figure 1:
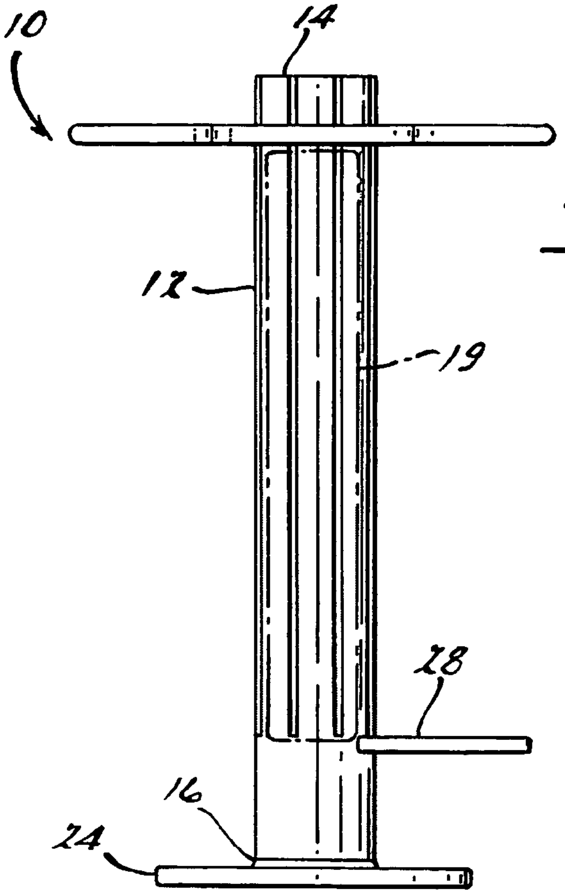
FIG. 1 is a front view of a first embodiment of the present invention.

As shown in FIGS. 1-10, a first embodiment 10 contains a hollow body 12 having an inner wall 13 and an outer wall 15, and, an open first end 14 and a closed second end 16. The body 12 is preferably cylindrical to accommodate the cylindrical shape of the food product, thereby reducing the need for a food holding means within the body 12. The body 12 also contains a plurality of grooves 18 preferably equidistantly spaced about the circumference of the body 12, and longitudinally extending from the first end 14 to points preferably equidistantly terminating above the second end 16. The body 12 also contains an inner cross-sectional area 20 for containment of the food product, and, an outer cross-sectional area 22 that as explained below, cooperates with a blade rack of a first embodiment of the invention. The body 12 is fixed upon a base 24, wherein a longitudinal axis 26 of the body 12 passes centrally and perpendicularly through the base 24. A pin holder 28 is inserted at the termination of the grooves 18. In a preferred embodiment, a pair of prongs 30 is integral to the pin holder 28 and inwardly extends from the outer circumference 22 through two of the grooves 18. A plurality of blades 32 is initially disposed at the first end 14 of the body 12. It should be appreciated that although preferred, the pin holder 28 and the prongs 30 may be omitted from the design if desired. In that case, once the food product is cut, the body 12 is simply inverted to remove the food product from the open end 14.

Figure 7:
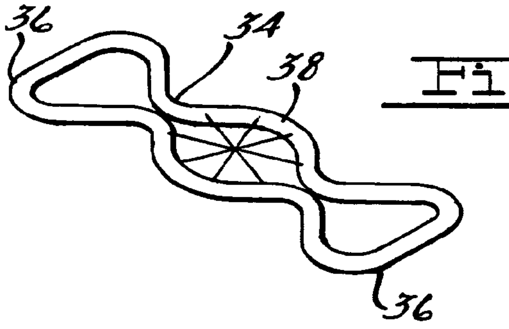
FIG. 7 is an iso view of a plurality of blades of the first embodiment.
Figure 8:
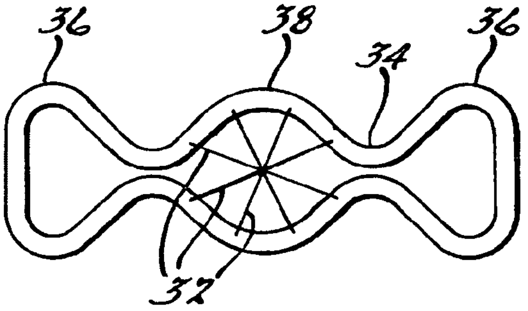
FIG. 8 is a top view of the plurality of blades of the first embodiment.
Figure 9:
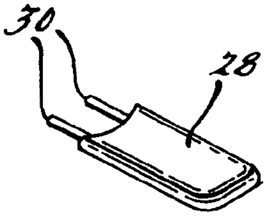
FIG. 9 is an iso view of a pin holder of the first embodiment.
Figure 10:
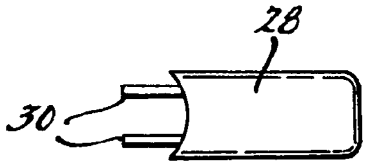
FIG. 10 is a top view of the pin holder of the first embodiment.
Figure 20:
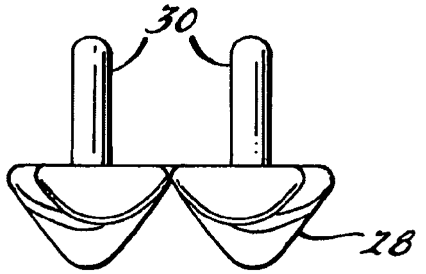
FIGS. 20-23 are various views of eyeglass shaped food holders associated with the second embodiment.
Figure 21:
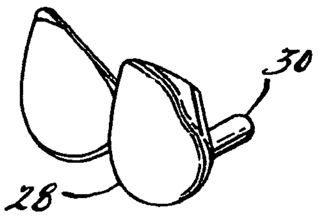
Figure 22:
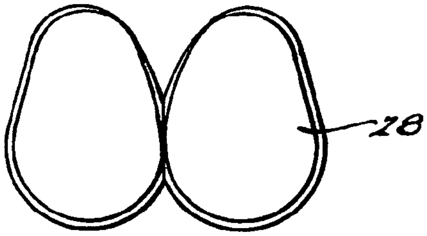
Figure 23:
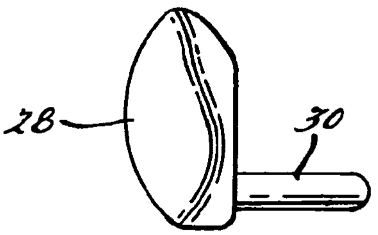
Figure 11:
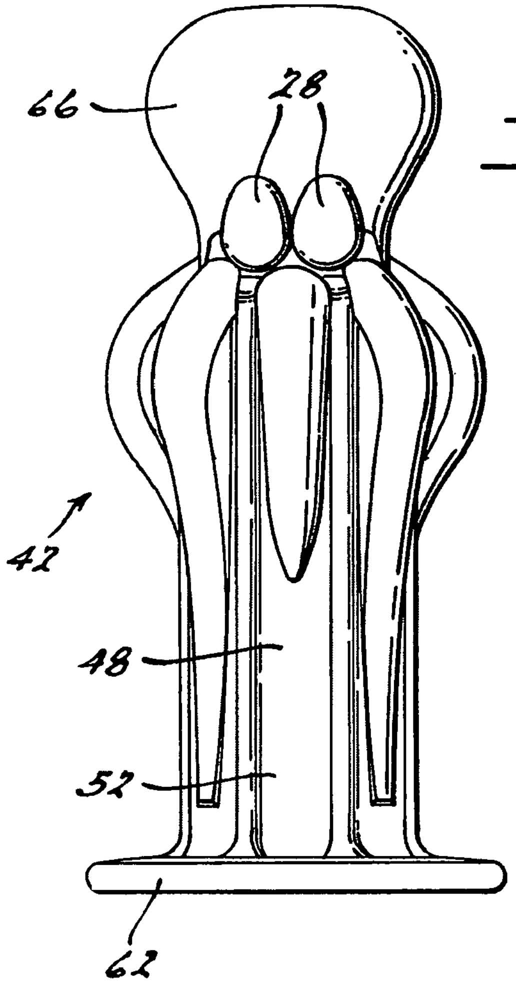
FIG. 11 is a front view of a second embodiment of the present invention.
Figure 12:
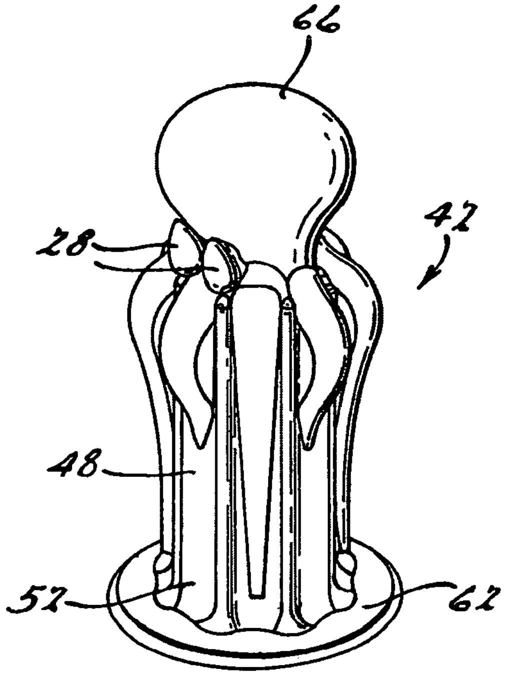
FIG. 12 is an iso view of the second embodiment of the present invention.
Figure 13:
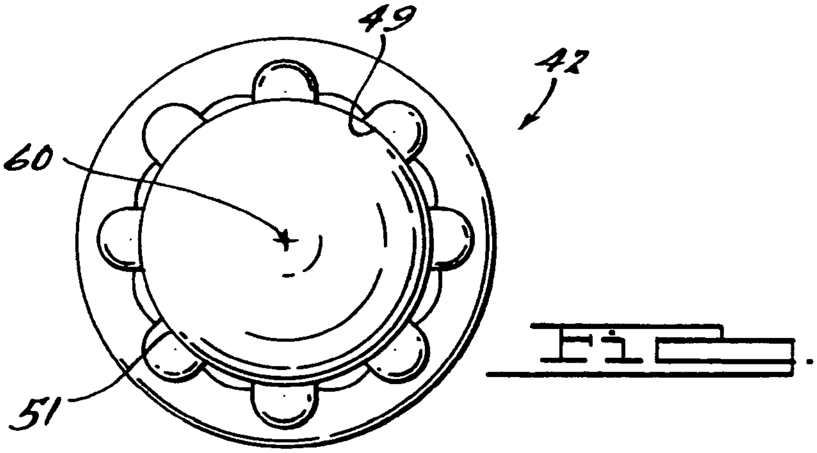
FIG. 13 is a top view of the second embodiment of the present invention.
Figure 14:
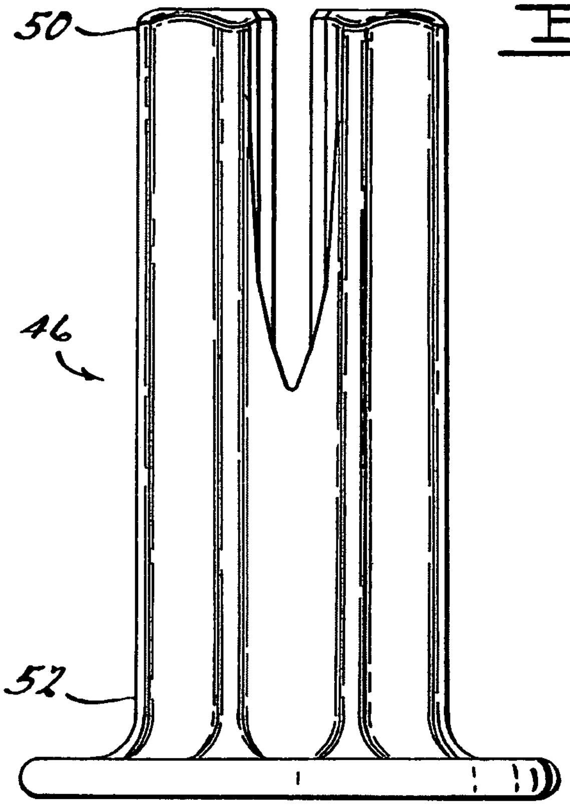
FIG. 14 is a front view of a bottom portion of the second embodiment.
Figure 15:
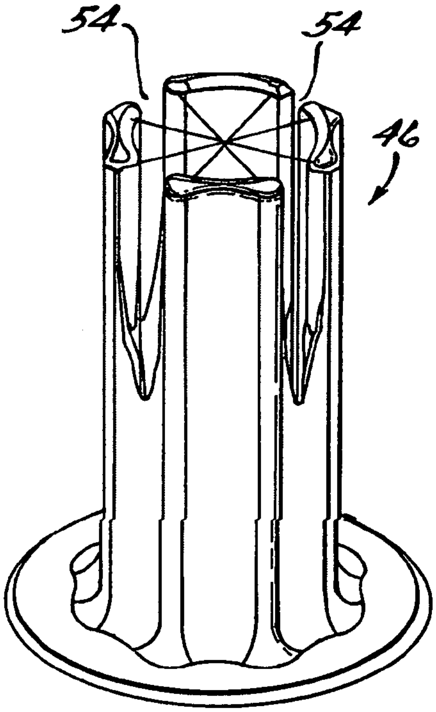
FIG. 15 is an iso view of the bottom portion of the second embodiment.

As shown in FIGS. 7 and 8, a blade holder 34 contains two handles 36. A circular rack 38 is integrally disposed between the handles 36. The plurality of blades 32, or otherwise stated as a plurality of wires, are fixed (e.g. wrapped) about the rack 38 so that the wires are equidistantly spaced about the rack 38. Stated another way, the blades 32 are equidistantly spaced about the rack 38 thereby establishing the same, or about the same, arcuate distances established by the grooves 18 about the body 12.

Figure 2:
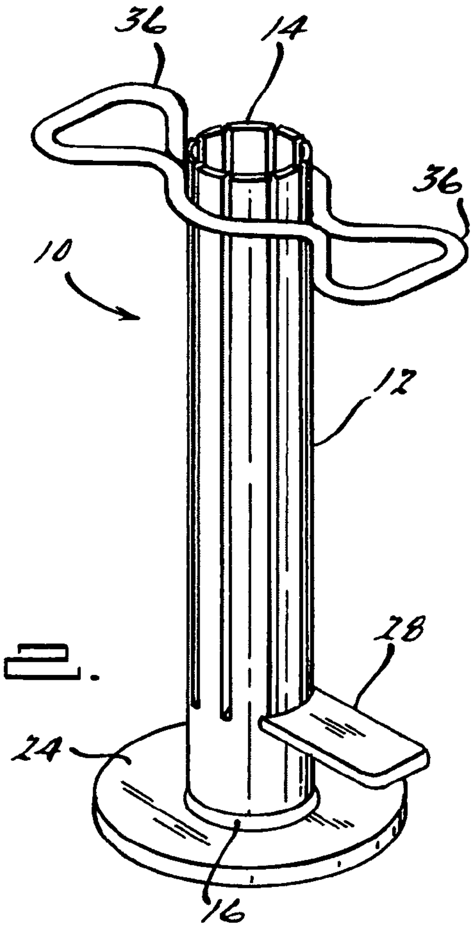
FIG. 2 is an iso view of the first embodiment of the present invention.
Figure 3:
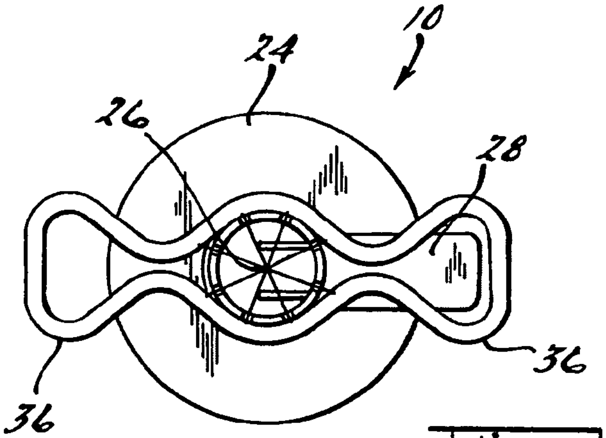
FIG. 3 is a top view of the first embodiment of the present invention.
Figure 4:
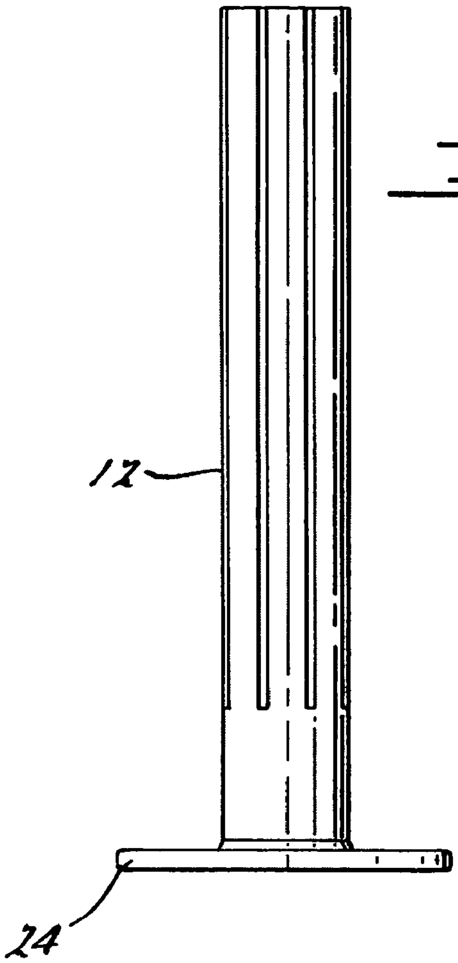
FIG. 4 is a front view of a bottom portion of the first embodiment.
Figure 5:
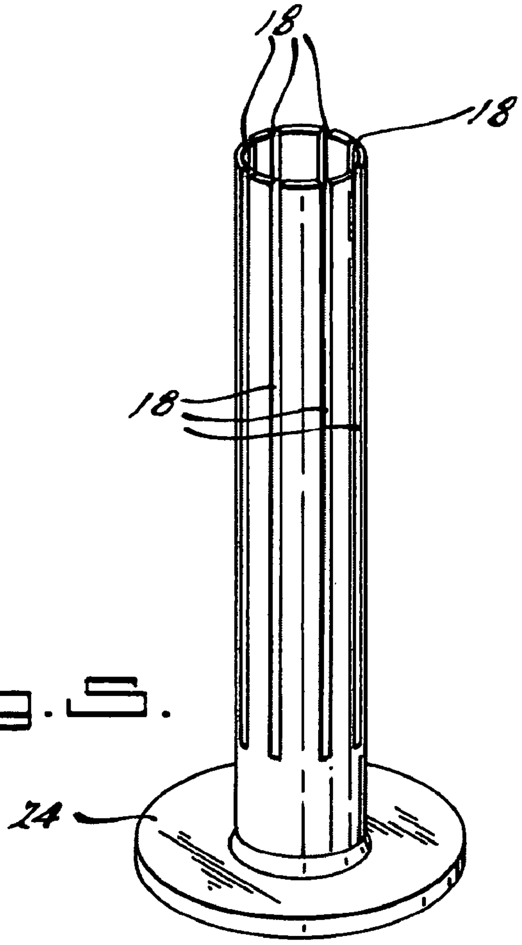
FIG. 5 is an iso view of the bottom portion of the first embodiment.
Figure 6:
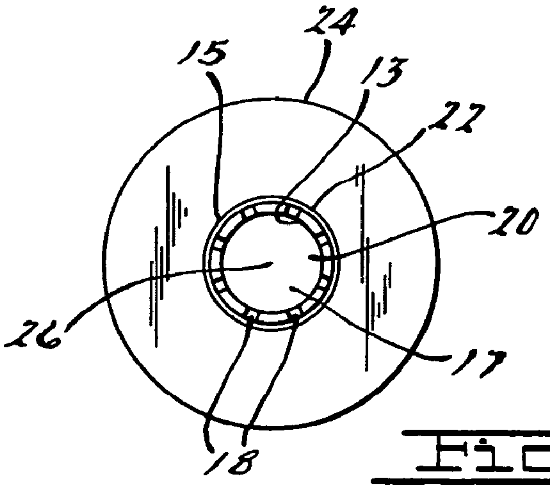
FIG. 6 is a top view of the bottom portion of the first embodiment.

Therefore, as shown in FIG. 2, each radial blade of the plurality of blades 32 individually corresponds to and fits within a respective groove of the plurality of grooves 18. As also shown in FIG. 2, the rack 38 approximates a circumference slightly greater than the circumference 22, and during operation thereby slideably engages the outer surface of the body 12.

In operation, the meat product is placed within the body 12. The prongs 30 of the pin holder 28 are then inserted through two of the grooves 18 and into the meat product. The plurality of blades 32 is then positioned at the first end 14. The user then grips the handles 36 and pushes downwardly through the meat and through the entire length of the grooves 18. The plurality of blades 32 are then removed by retracting the blades upwardly and through the first end 14. The pin holder 28 is then grasped and moved in the same direction thereby removing the meat product from the body 12.

Figure 16:
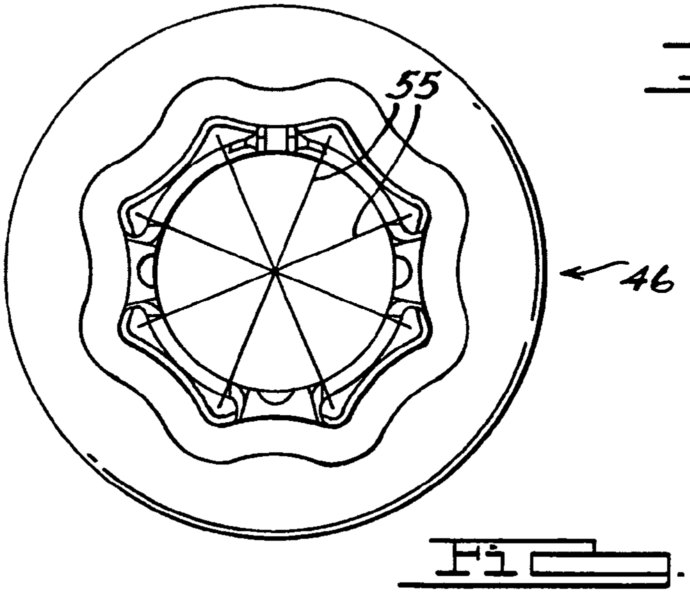
FIG. 16 is a top view of the bottom portion of the second embodiment.

As shown in FIGS. 11-19, a second embodiment 42 contains an upper portion 44 and a lower portion 46. The lower portion contains a body 48 having an inner wall 49 and an outer wall 51, and, an open first end 50 and a closed second end 52. A plurality of grooves 54 extends from the first end 50 to points preferably equidistantly terminating above the second end 52. A plurality of blades 55 is disposed within an upper region of the body 48. As shown in FIG. 16, the blades 55 are equidistantly fixed to the inner wall 49 and/or to the open end 50. As also shown, the blades 55 extend across multiple radii of the cylindrical body 48, thereby preferably forming a plurality of pie-shaped regions equal in area. A base 62 is fixed to the body 48 at the second end 52, wherein an axis 60 passes centrally and perpendicularly therethrough.

The upper portion 44 contains a meat holder or food receptacle 66 and a plurality of arms 68 integral thereto, thereby functioning to hold the meat or food product as it is sliced.

Figure 17A:
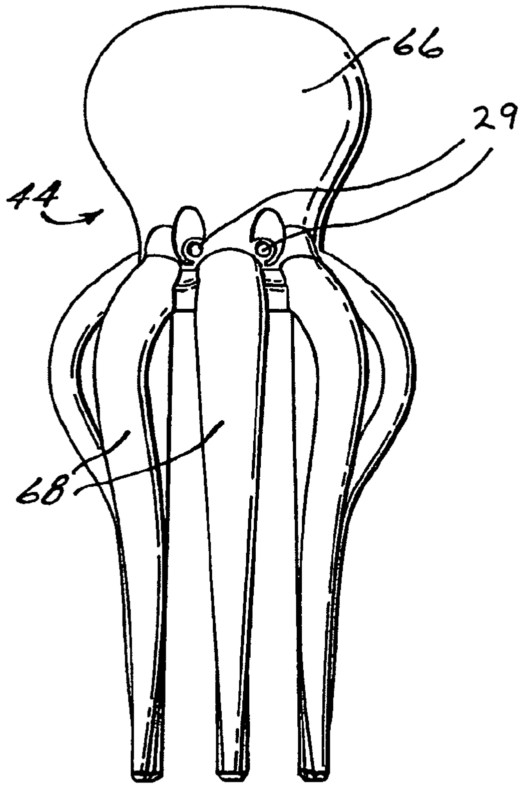
FIG. 17 is a front view of a top portion of the second embodiment.
Figure 17B:
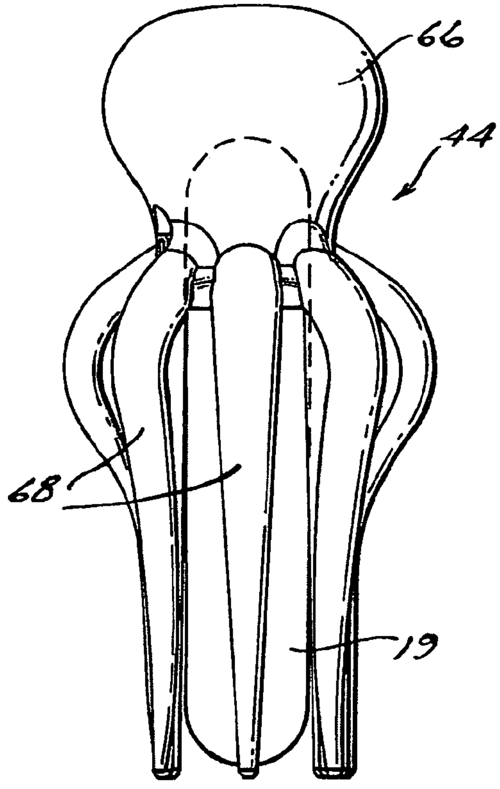
Figure 18:
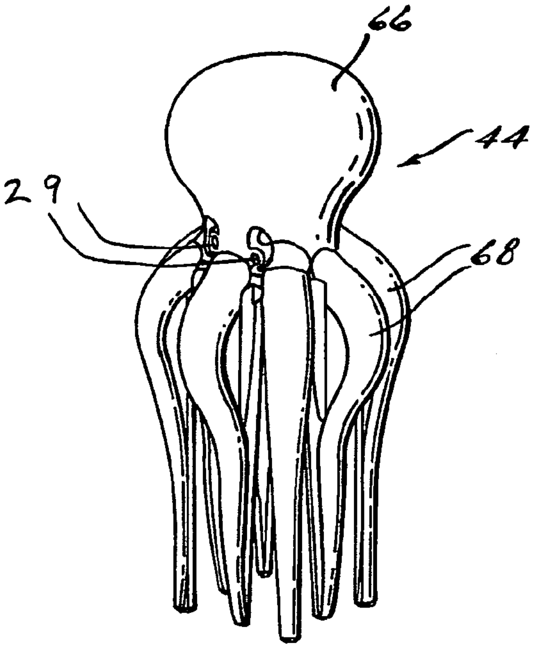
FIG. 18 is an iso view of the top portion of the second embodiment.
Figure 19:
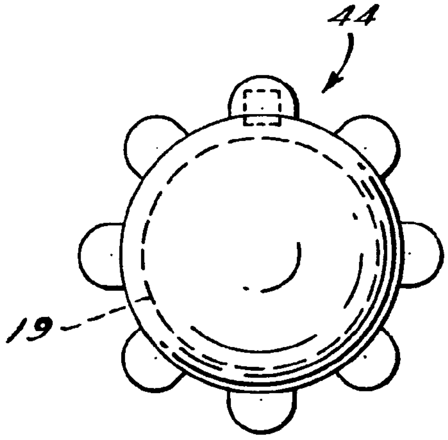
FIG. 19 is a top view of the top portion of the second embodiment.

In operation, the meat product is placed within the meat holder 66. The meat holder 66 and the arms 68 are then placed over the first end 50 of the lower portion 46. If desired, the prongs 30 of the pin holder 28 may be inserted through the holes 29, as shown in FIGS. 17*a* and 18, and then into the meat product. The meat product is then driven down through the blades 55, resulting in a meat product having a plurality of cut portions having an equivalent or closely equivalent volumetric shape. Once the food product is sliced as desired, the food or meat holder 66 is then moved upwardly from the second end 52 or toward the first end 50 while gripping an uncut portion of the food. The resultant sliced food product is thereby removed from the lower portion 46 and again through the blades 55.

Stated another way, a food slicer 10 of the present invention contains a hollow body 12 having an inner wall 13 defining an interior 17 and an outer wall 15 for containment of a food product therein. A plurality of blades 32 extends across the interior 17 of the body thereby cutting a food product 19 biased against the blades 32.

The components of the present invention are generally made from plastic, metal, or other suitably rigid materials. The parts therefore may be molded or stamped, or by other methods known in the art. For example, the hollow body may be molded if plastic, or die cast if made from metal. The blade rack may be molded if plastic or stamped if made from metal. The blades may be molded if plastic and then sharpened by grinding, for example. Or, the blades may be stamped and sharpened if necessary when made from metal. If made from metal wire, the blades may simply be extruded to form wire in fine to course diameters, 1/128 to 1/16 inch diameters for example only, depending on design requirements.

While specific embodiments have been described in detail in the foregoing detailed description and illustrated in the accompanying drawings, those with ordinary skill in the art will appreciate that various modifications and alternatives to those details could be developed in light of the overall teachings of the disclosure. For example, the present invention may be used to slice vegetables or fruit, as well as meat. Or, the number of blades may be increased or decreased to alter the size and number of cut portions of the product being sliced. Accordingly, the particular arrangements disclosed are meant to be illustrative only and not limiting as to the scope of the invention, which is to be given the full breadth of any claims that are derivable from the description herein, and any and all equivalents thereof.

What is claimed is:

1. A method of slicing a food item comprising:

providing a fixed plurality of blades within an elongated hollow body and across a diameter thereof thereby preventing movement of said plurality of blades, the elongated hollow body having a length greater than the diameter;

inserting an elongated food item to be sliced in a receptacle, said elongated food item supported by said elongated hollow body; and slidably engaging the receptacle along an outer circumference of the hollow body to bias the item against and at least partially through the blades thereby slicing the item.

2. An appliance comprising:

an elongated hollow body for supporting an elongated food product, said elongated hollow body having an inner wall and an outer wall forming an interior, a diameter, and a length greater than said diameter;

a plurality of blades fixed within said interior and extending across said interior thereby preventing movement of said plurality of blades; and a receptacle for holding an item to be sliced, that upon appliance operation is slidably engaged along said outer wall thereby forcing said item against said blades for slicing thereof; and at least one hole extending through said food receptacle and at least one corresponding prong extending through said at least one hole for holding said food product.

* * * * *